United States Patent [19]
Yoshida

[11] Patent Number: 4,500,982
[45] Date of Patent: Feb. 19, 1985

[54] SERVO CIRCUIT FOR A MOTOR FOR REPRODUCING A PCM AUDIO DISK

[75] Inventor: Tadao Yoshida, Kawasaki, Japan

[73] Assignee: Sony Corporation, Tokyo, Japan

[21] Appl. No.: 604,433

[22] Filed: May 1, 1984

Related U.S. Application Data

[63] Continuation of Ser. No. 381,958, May 25, 1982, abandoned.

[30] Foreign Application Priority Data

May 29, 1981 [JP] Japan .................................. 56-83028

[51] Int. Cl.³ .............................................. G11B 19/24
[52] U.S. Cl. ...................................... 369/50; 369/240
[58] Field of Search .................. 369/240, 239, 47, 50, 369/189; 358/342; 360/73

[56] References Cited

U.S. PATENT DOCUMENTS

| | | | |
|---|---|---|---|
| 4,223,349 | 9/1980 | Dakin et al. ............................ | 369/50 |
| 4,228,326 | 10/1980 | Dakin et al. ....................... | 369/50 X |
| 4,338,683 | 7/1982 | Furakawa et al. ............... | 369/240 X |
| 4,388,713 | 6/1983 | Tatsuguchi ..................... | 369/240 X |

Primary Examiner—Robert L. Richardson
Attorney, Agent, or Firm—Hill, Van Santen, Steadman & Simpson

[57] ABSTRACT

A servo system for use with apparatus for reproducing a disk on which PCM pulse code modulation signals have been modulated by a run length limited code and which are recorded at a constant linear velocity and the circuit detects the length of a period during which a playback signal is inverted and produces an output corresponding to the detected length and has a peak value hold circuit for maintaining a peak value of the output and a bottom value hold circuit at a later stage of the peak value hold circuit which has a time constant which is larger than the charging time constant of the peak value hold circuit so as to produce an output which follows the output of the peak value hold circuit. A comparator compares the output of the bottom value hold circuit with a reference value so as to produce a signal for controlling a disk drive motor such that a maximum or minimum length during which the playback signal is inverted equals the length when the linear velocity is a reference value so that the linear velocity will be maintained constant during playback.

5 Claims, 6 Drawing Figures

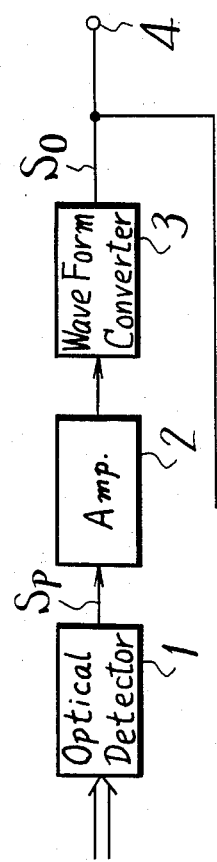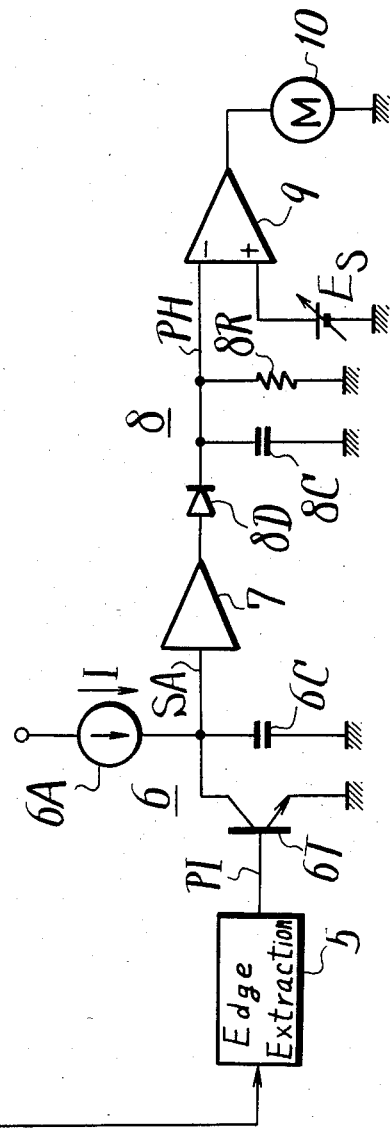
F I G. 1

FIG. 3
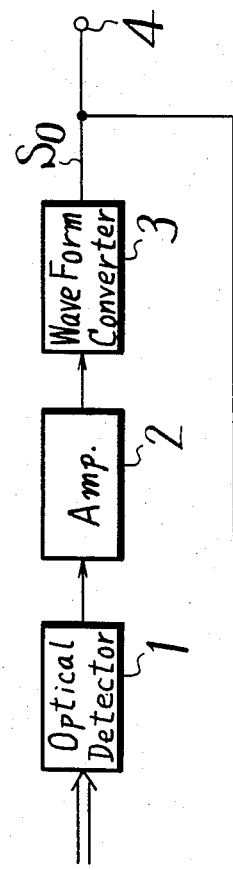
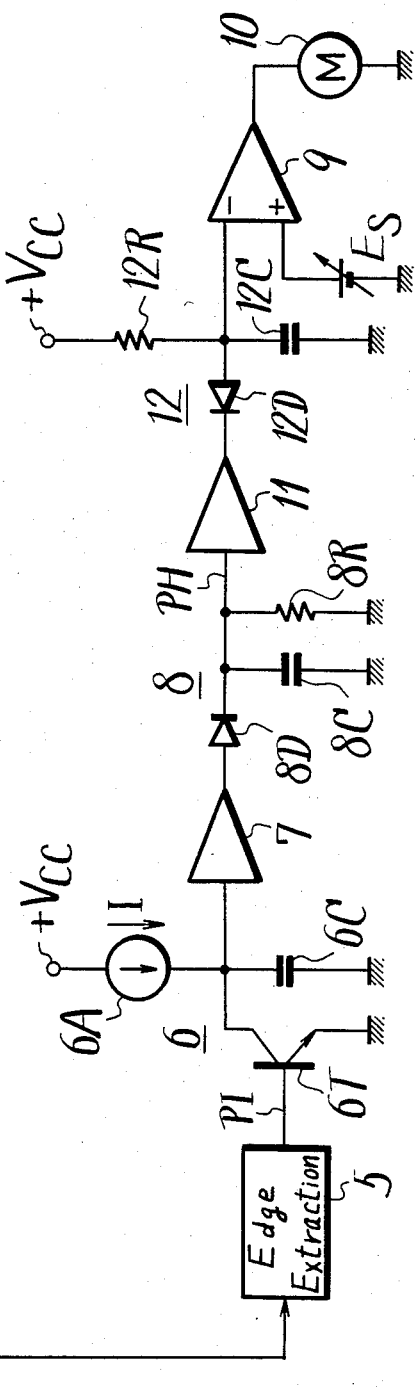

SERVO CIRCUIT FOR A MOTOR FOR REPRODUCING A PCM AUDIO DISK

This application is a continuation of application Ser. No. 381,958, filed May 25, 1982, now abandoned.

BACKGROUND OF THE INVENTION

1. Field of the Invention

This invention relates in general to a servo circuit for use with an apparatus for reproducing information recorded on a disk and in particular to a servo circuit for use with an apparatus for reproducing information on a disk such as PCM (pulse code modulation) information on an audio disk wherein a digital signal is recorded.

2. Description of the Prior Art

Signal detection systems for PCM (pulse code modulation) audio disk such as optical and electrostatic capacitive types are known in the prior art.

Two methods have been proposed for recording audio PCM signals on a disk. In one system the information is recorded on the disk which is rotated at a constant angular velocity and the other system is to record information on the disk which is rotated at a constant linear velocity. So as to increase the recording density it is preferable to record the audio PCM signals on the disk at a constant linear velocity. For this case, the disk on which the audio PCM signal is recorded at a constant linear velocity must be played back such that the disk is rotated at a constant linear velocity.

It is known in the prior art to control a disk so as to rotate it at a constant linear velocity during the playback mode in which the position of a pickup device is detected with a potentiometer and the detected output is delivered to a divider so as to provide control information since the necessary number becomes an inverse number for that position. In this method, an arrangement consisting of the position detector and the divider for controlling rotation of the disk are very expensive and complicated.

In order to obviate these defects other apparatus has been proposed wherein the detector for detecting the position of the pickup is eliminated and a playback signal from the disk is utilized to control the disk so as to rotate the disk at a constant linear velocity.

In examples of such conventional apparatus during recording and audio PCM signal it is recorded with a base band with a carrier modulation system such as a AM (amplitude modulation) system and a FM frequency modulation system and the modulation method using a run length limited code is usually employed. Such run length limited code modulation method is used to raise the recording efficiency by extending or prolonging the minimum transition interval $T_{min}$ between the transition of two data bits representative of "0" and "1" which is the minimum interval of a period during which the signal is inverted and the system results in a self-clock on the playback apparatus by shortening the maximum transition interval $T_{max}$ which is a maximum interval during which the period is inverted.

In such prior art apparatus, the deviation or displacement of the maximum transition interval $T_{max}$ are the minimum transitional interval $T_{min}$ from a reference value when a linear velocity is utilized as a reference which is detected and used as information to drive the velocity servo.

By utilizing the fact that the modulation output where the maximum transition interval $T_{max}$ is continuous and is not generated by normal modulation, a bit pattern in which such maximum transitional interval $T_{max}$ occurs twice is employed as a frame synchronizing signal. Thus, utilizing this frame synchronizing signal which always appears during one frame period without fail allows the rotation of the disk or motor to be controlled such that the maximum transition interval $T_{max}$ equals the reference value.

As an example, the maximum transitional interval $T_{max}$ can be selected as 5.5 T where T represents a bit cell period of an input data.

FIG. 1 schematically illustrates an example of the conventional reproducing apparatus of the prior art which is applied to an apparatus for reproducing a disk of an optical signal detection system.

In FIG. 1, a photo detector 1 reproduces a playback PCM signal $S_p$ which has a wave form which is distorted and is then an almost sine wave shape. The signal $S_p$ is supplied to an amplifier 2 and then to a wave form converting circuit or converter 3 which obtains a signal $S_0$ illustrated in FIG. 2A which indicates the "1" and "0" of the recorded signal and this output signal is supplied to output terminal 4. The signal $S_0$ is also supplied to an edge extracting circuit 5 which comprises a differentiating circuit and which produces a signal PI illustrated in FIG. 2B which indicates the rising up and falling down edges of the signal $S_0$.

The signal PI is supplied to the base of a transistor 6T which serves to reset an integrating circuit or integrator 6. The integrator 6 has a current I which flows from the constant current supply source 6A to a capacitor 6C which charges and discharges and this current charges the capacitor 6C and the voltage across the capacitor 6C will be raised to a high value with a constant charging rate. When the pulse PI is applied to the transistor 6T, the transistor 6T will be turned on by pulse PI which will cause the voltage on the capacitor 6C to be instantly discharged through the transistor. Thus, the integrator 6 produces a sawtooth-wave voltage SA illustrated in FIG. 2C which has peaks equal to the level corresponding to the length of the transition interval of the signal $S_0$.

The sawtooth wave voltage SA is supplied through a buffer amplifier 7 to a peak value hold circuit 8. The output voltage of the buffer amplifier 7 is supplied through a diode 8D to a capacitor 8C to charge it and the capacitor 8C is discharged at a time constant determined by a resistor 8R and the capacitor 8C. The discharge time constant is selected to be several to 10 times the repeating period of the data frame of the playback signal so that the peak value of the sawtooth wave voltage SA will be held by the capacitor 8C.

Since the frame synchronizing signal appears once for every one period of the data frame, the output signal PH illustrated in FIG. 2D obtained from the peak value hold circuit 8 maintains a level corresponding to the length of the maximum transition interval $T_{max}$ within the playback signal. Thus, if the level of the signal provided by the peak value hold circuit 8 when the maximum transition interval $T_{max}$ is exactly the correct transition interval 5.5 T is taken as a velocity reference voltage $E_S$ and the difference in level between the velocity reference voltage $E_s$ and the output signal PH of the peak value hold circuit is detected it will indicate the amount of the deviation of the rotation of velocity of the disk varies from linear velocity when recording.

For this reason, the output signal PH of the peak value hold circuit 8 is supplied to a comparator 9 in which the difference from the velocity reference voltage $E_S$ is detected. A spindle motor for rotating the disk is controlled by the output signal from the comparator 9 and, thus, the disk will be adapted so that it rotates at a constant linear velocity using the playback signal.

However, in this apparatus, if a scratch is formed on a disk or dust adheres to the disk, there will be a drop-out in the playback signal and also when a track is jumped during the playback mode, the signals illustrated in FIGS. 2A through 2D will not occur and, thus, the pulse PI will not exist at the output of the edge extracting circuit 5 for this period. However, the capacitor 6C in the integrator 6 will continue to be charged and the output voltage PH of the peak value hold circuit 8 will gradually increase which will cause the spindle motor 10 to drive at an inaccurate speed.

SUMMARY OF THE INVENTION

It is an object of the present invention therefore, to provide a servo circuit for use with an apparatus for reproducing a PCM audio disk which can eliminate the defects inherent in conventional prior art apparatus.

Another object is to provide a servo circuit for use with apparatus for reproducing a PCM audio disk which is simple in construction and is capable of controlling a spindle motor for a disk so that it will be safely rotated even when a drop-out or jumping of a track occurs.

According to one aspect of the invention, a servo circuit is provided with apparatus for reproducing a disk on which a PCM pulse code modulation signal is recorded and which is modulated by a run length limited code at a constant linear velocity and comprises a circuit for detecting the length of a period during which a playback signal is inverted and for producing an output corresponding to the detected length and a peak value hold circuit for maintaining the peak value of the output from said circuit and a bottom value hold circuit which is provided in a rear stage of the peak value hold circuit and has a time constant which is sufficiently larger than the charging time constant of the peak value hold circuit so as to produce an output which follows the output of the peak value hold circuit and further includes a comparator for comparing the output of the bottom value hold circuit with a reference value so as to control a disk drive motor such that a maximum or minimum length of the period during which said playback signal is inverted equals the length provided when the linear velocity is the reference value so that the linear velocity during playback will be the reference value.

Other objects, features and advantages of the invention will become apparent from the following description taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a schematic block diagram illustrating an example of the prior art apparatus for reproducing PCM audio disks;

FIG. 3 is a schematic block diagram illustrating the invention and comprising a servo circuit for use with apparatus for reproducing PCM audio disks.

DESCRIPTION OF THE PREFERRED EMBODIMENTS

Figure 2:
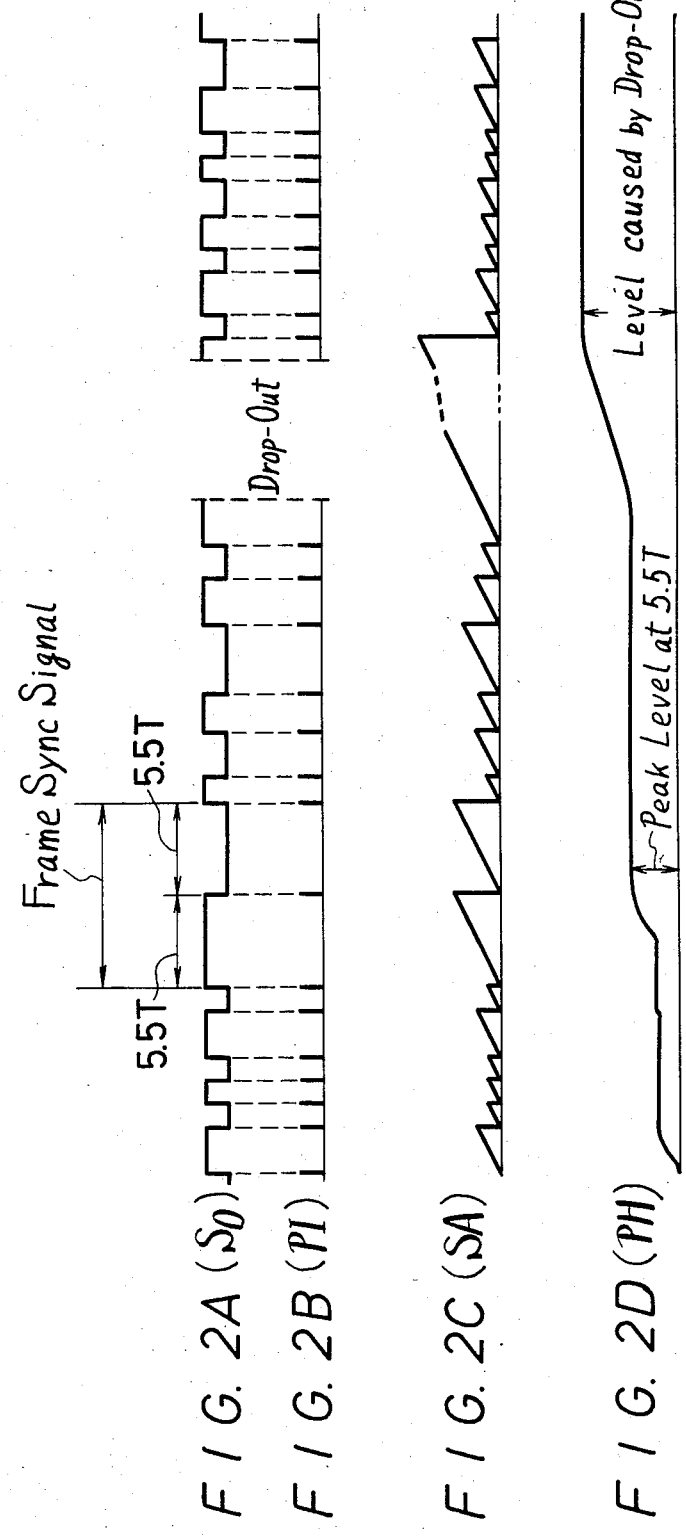
FIGS. 2A through 2D are respectively wave form diagrams for explaining the invention.

FIG. 3 illustrates the invention wherein a bottom hold circuit is inserted between the comparator 9 and the resistor 8R, the capacitor 8C and the diode 8D of the circuit illustrated in FIG. 1.

Thus, in the invention, the optical detector 1, the amplifier 2, the wave form converter 3 and the edge extracting circuit 5 and the integrator 6, buffer amplifier 7, diode 8D, capacitor 8C, and resistor 8R are the same as in the circuit of FIG. 1. In the invention, a buffer amplifier 11 is connected to receive the output across the resistor 8R and supplies an input to a diode 12D which is poled in the opposite direction of the diode 8D. Positive reference voltage $+V_{CC}$ is supplied through a resistor 12R to a capacitor 12C which has its other side grounded. The reference voltage $E_S$ is connected to the comparator 9 and the junction point between the resistor 12R and capacitor 12C is connected to the negative input terminal of the comparator 9. The charge time constant determined by the capacitor 12C and the resistor 12R which form portions of the bottom hold circuit 12 is selected to have a value which is greater than the discharge time constant of the peak value hold circuit 8 and preferably should be 10 or more times greater than the discharge time constant of the peak value hold circuit 8.

In the circuit of FIG. 3, the output signal PH of the peak value hold circuit 8 is supplied through the buffer amplifier 11 to the bottom hold value circuit 12 and normally a discharge current will flow through the diode 12D from the voltage charged on the capacitor 12C so that the charge voltage on the capacitor 12C will equal the output voltage PH of the peak value hold circuit 8.

However, when the peak value hold voltage rises, normally caused by drop-out or track jumping, the diode 12D will be cut-off so as to permit the power source $+V_{CC}$ to supply current through the resistor 12R to the capacitor 12C. At this time, since the charge time constant is extremely large as stated above, the charge voltage on the capacitor 12C will not rise to be so high as the peak hold voltage PH. In other words, the charge voltage will not vary substantially if the drop-out period is several frames in length.

The output voltage from the bottom value hold circuit 132 is supplied to the comparator 9 where it is compared with a reference voltage $E_S$ so that the spindle motor 12 is controlled in rotation by the difference in level between the output voltage and the reference voltage $E_S$ which is applied to the comparator 9. Thus, the spindle motor will not be substantially influenced by drop-out and will stably rotate.

In the invention, even if drop-out or the like occurs it is possible to control the spindle motor 10 so that it will stably rotate thus removing the defects of conventional prior art system. Also, the invention only requires the addition of the bottom hold circuit 12 to the circuit of the prior art. Therefore, the invention is very simple and inexpensive.

In this description, the charge time constant of the bottom value hold circuit has been determined so that it is larger than the discharge time constant of the peak value hold circuit 8 as described above and the value can be determined by considering the probability of the occurrence of a drop-out.

The bottom value holds circuit 12, thus, produces and holds the lowest or bottom voltage value which the voltage PH takes.

Although the invention has been described with respect to preferred embodiments, it is not to be so limited as changes and modifications can be made which are within the full intended scope of the invention as defined by the appended claims.

I claim as my invention:

1. A servo circuit for driving a disk drive motor for a disk upon which a pulse code modulation signal with a run length limited code is recorded at a constant linear velocity comprising, an optical detector scanning said disk and producing a digital square wave output signal, a differentiating circuit receiving an output of said optical detector, and producing a pulse signal, a sawtooth signal producing circuit with a first time constant receiving the output of said differentiating circuit and the amplitude level of said sawtooth signal (SA) varying as a function of the output of said differentiating circuit, a maximum value holding circuit receiving the output of said sawtooth signal producing circuit, a first diode with one side connnected to the output of said maximum value holding circuit, a fixed voltage supply, a first resistor and a first capacitor connected between ground and said fixed voltage supply and the product of the resistance of said first resistor and the capacitance of said first capacitor being equal to a second time constant which is substantially more than said first time constant, an amplitude comparator connected to the second side of said first diode and to the junction point between said first resistor and first capacitor, a reference voltage source connected to said comparator, and said disk drive motor receiving the output of said comparator.

2. A servo circuit according to claim 1 wherein said maximum value holding circuit includes a second diode which has a first side connected to the output of said differentiating circuit and its second side connected to the first side of said first diode, and a second resistor and a second capacitor connected in parallel between said one side of said first diode and ground and the product of their resistance and their capacitance being equal to said first time constant.

3. A servo circuit according to claim 2 wherein said second time constant is ten or more times said firsttime constant.

4. A servo circuit according to claim 3 including a buffer amplifier connected between said first and second diodes.

5. A servo circuit for use with an apparatus for reproducing a disc on which a PCM (pulse code modulation) signal modulated by a run length limited code is recorded comprising: an input terminal for receivng a reproduced signal from the disc; a circuit for detecting the transition interval contained in said reproduced signal and for producing a detecting signal in response thereto; a first peak value hold circuit receiving and holding the peak value of said detecting signal during a predetermined period; a second peak value hold circut connected to said first peak value hold circuit and receiving said peak value from said first peak value holding circuit, whereby increase of the peak value of said second peak hold circuit is slower than that of the peak value of said first hold circuit when the peak value of said first peak value hold circuit increases, so that said second peak value hold circuit holds the peak value thereof during a period longer than said predetermined period; and a comparatore for comparing the output of said second peak value hold circuit with a reference signal corresponding to the maximum transition interval during rotation of the disc at a predetermined velocity and for producing a control signal to control a disc driving means.

* * * * *